May 4, 1943.　　　　T. SEYBERT　　　　2,318,534
BATTER MIXER
Filed Aug. 30, 1941　　　　2 Sheets-Sheet 1
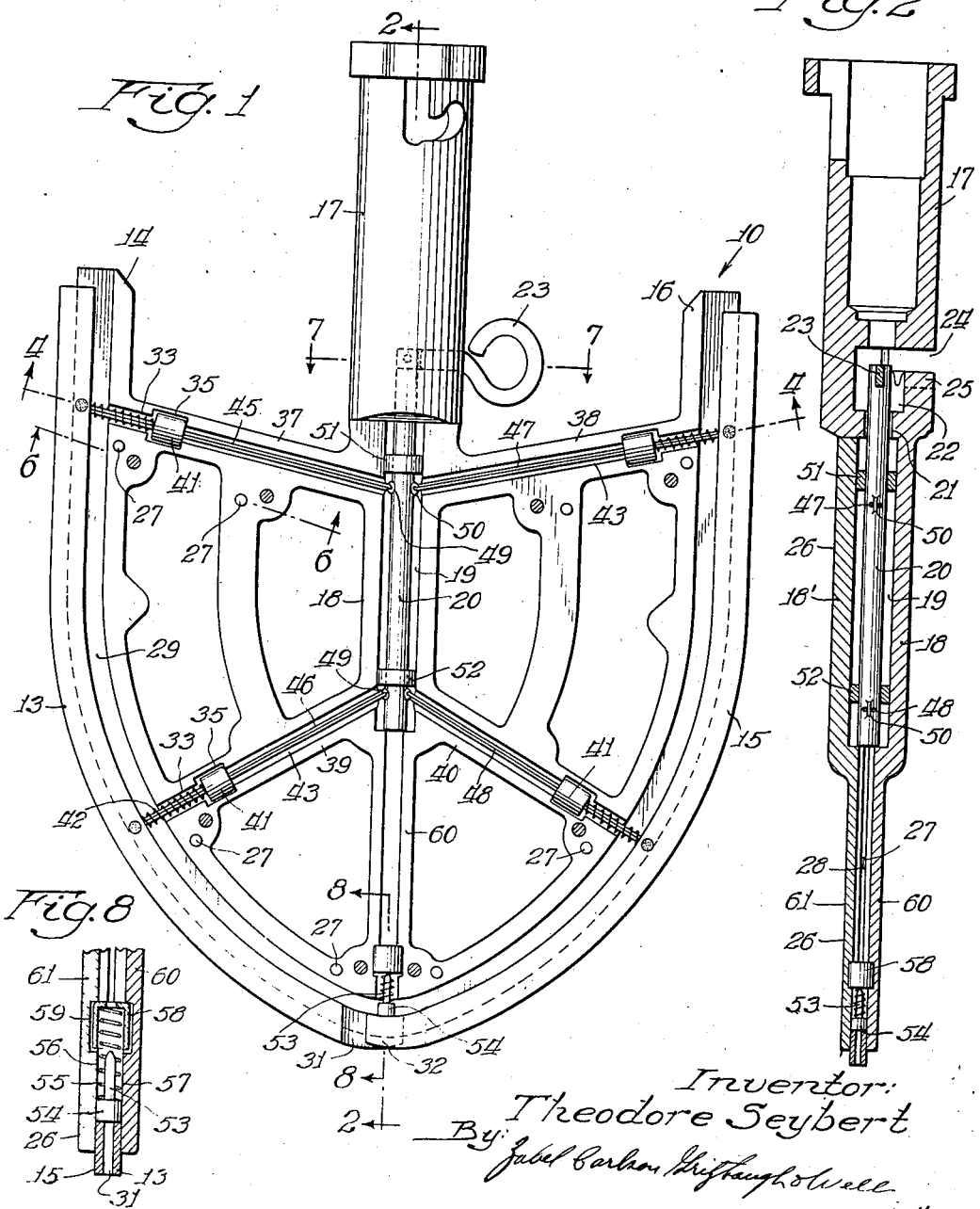

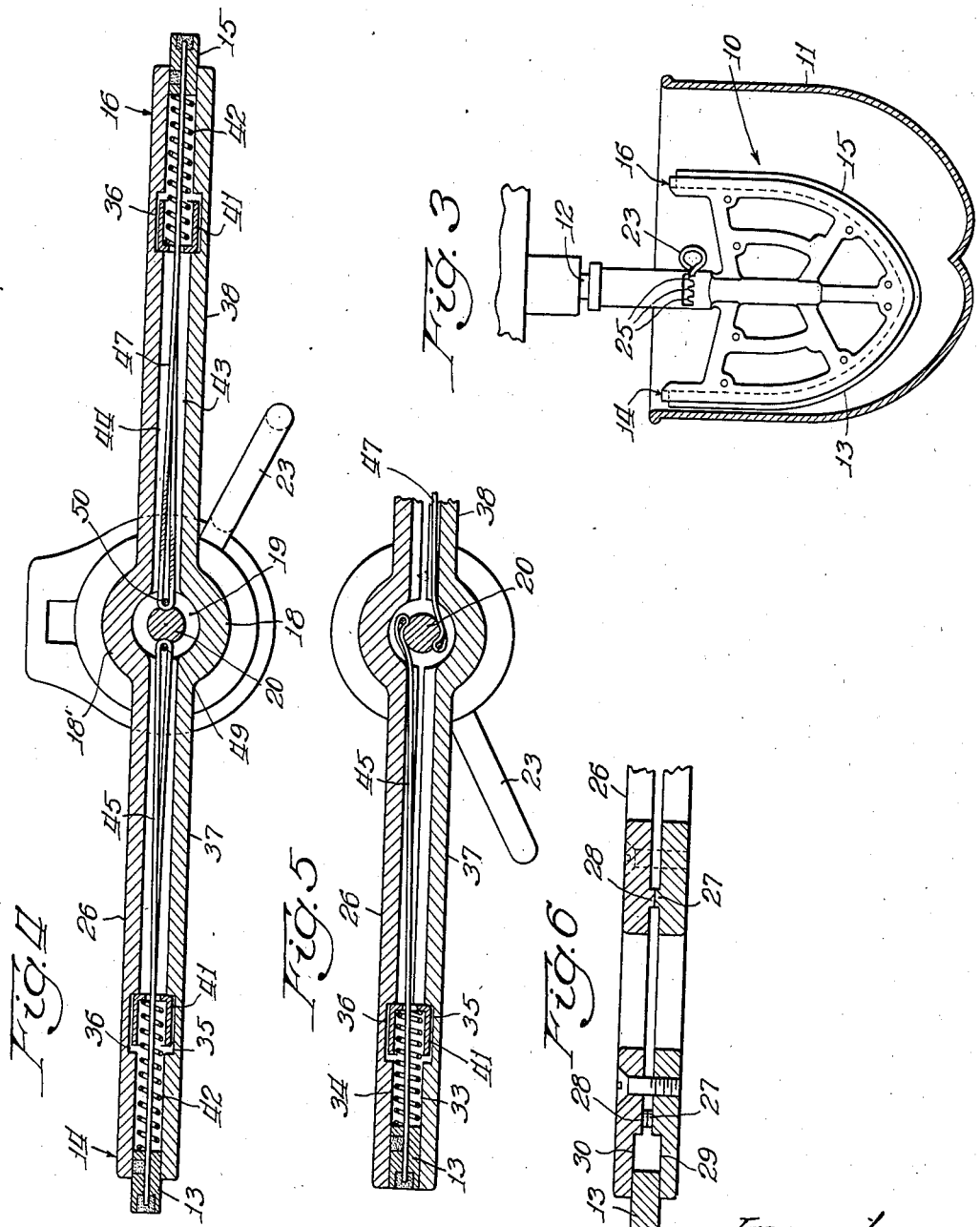

Patented May 4, 1943

2,318,534

UNITED STATES PATENT OFFICE 2,318,534

BATTER MIXER

Theodore Seybert, Chicago, Ill.

Application August 30, 1941, Serial No. 408,940

6 Claims. (Cl. 259—129)

The present invention relates to batter mixers of the general type shown and claimed in my prior Patent No. 2,178,269. It is the purpose of the present invention to provide an improved batter mixer that is more simple in its construction and more fool-proof in its operation than the device illustrated in the patent above identified. It is the further purpose of the invention to provide a novel construction of the scraping mechanism of the batter mixer whereby a single scraping shoe may be used for an entire blade of the mixer, the shoe being adjustable both axially of the blade and radially of the blade with respect to its axis of rotation, and the two movements of the shoe being substantially independent of each other, thus permitting the shoe to adjust itself to the mixing bowl with the same facility that a number of small shoe sections would have.

It is the further object of the invention to provide a novel mechanism for adjusting the scraping shoes with respect to the blades of the batter mixer.

It is also an object of the invention to provide a batter mixer having adjustable scraping shoes wherein the construction is such that all of the parts are readily accessible for cleaning with hot water, in order that the device may be maintained in a sanitary condition.

The features and advantages of the invention will appear more fully from the following description, reference being had to the accompanying drawings, wherein a preferred form of the invention is shown. It is to be understood, however, that the drawings and description are illustrative only, and that they should not be taken as limiting the invention except insofar as it is limited by the claims.

In the drawings—

Fig. 1 is a view in side elevation of the batter mixer with the cover piece removed to show the interior construction;

Fig. 2 is a sectional view taken on the line 2—2 of Fig. 1, showing the cover member in place;

Fig. 3 is a sectional view taken through a mixing bowl with the batter mixer therein;

Fig. 4 is a sectional view taken substantially on the line 4—4 of Fig. 1;

Fig. 5 is a fragmentary sectional view taken on the same line as Fig. 4, but showing the parts in a changed position;

Fig. 6 is a fragmentary sectional view taken on the line 6—6 of Fig. 1;

Fig. 7 is a sectional view taken on the line 7—7 of Fig. 1; and

Fig. 8 is an enlarged fragmentary sectional view taken on the line 8—8 of Fig. 1.

Referring now in detail to the drawings, the present invention is embodied in a batter mixer 10 which is adapted to be inserted in a mixing bowl 11 and which is adapted to be driven by a drive shaft 12 of an electric motor or other suitable drive mechanism. The batter mixer is especially adapted for use in the mixing of batter for cake, pastry, or the like, and is provided with a scraping shoe 13 for one blade 14 of the mixer, and a shoe 15 for another blade 16 of the mixer. In the form of the invention shown the mixer has just two blades 14 and 16, which are symmetrical with respect to the axis of the driving shaft, these two blades being diametrically opposite each other. It will be understood, of course, that the mixer may have as many blades as are desirable. For most purposes the two blades shown are best.

In the mixing of batter it is well known that the thicker unmixed parts of the batter tend to cling to the wall of the bowl 11, and this thicker layer must be scraped off in order to get an even mixture of the batter. The blades of the batter mixer are made so as to conform as nearly as possible to the contour of the mixing bowl, but they cannot be operated directly in contact with the wall of the bowl because of their rigidity. In my prior patent there is shown an adjustable shoe construction whereby the shoes may yieldingly press against the surface of the bowl and scrape off the accumulated material. In the present device this scraping operation is accomplished by a much more simple construction that eliminates a large number of the parts embodied in the prior device.

The blades 14 and 16 are integrally connected to a hub 17 which is connected to the shaft 12 in any suitable manner. This hub 17 has a reduced extension 18 which is provided with a bore 19 to receive a shaft 20. The shaft 20 extends through an opening 21 into the enlarged portion of the hub 17 above the connection of the blades thereto. In the enlarged portion a chamber 22 is formed, and an operating handle 23 is attached to the shaft 20, the handle extending out through a slot 24 in the hub 17. The slot 24 has a plurality of notches 25 formed in the lower wall thereof so that the handle 23 may be latched in any one of the notches 25. Blades 14 and 16 comprise the parts integral with the hub 17 and a cover member 26. The cover member 26 is substantially a duplicate of the blades 14 and 16, but is spaced throughout its surface from the blades 14 and 16 by properly spaced lugs 27 on the blades 14 and 16 and corresponding lugs 28 on the cover member 26 (see Fig. 6). This spacing is an important factor in devices of this character. It enables the user of the mixer to clean the blades and their associated scraping shoes whenever any mixing operation is completed. Hot water may be forced through the spaces between the blades and the cover member, so as to wash out any batter that gets into the interior where the adjusting mechanism for the scraping shoes is located.

The blades and the cover member are provided with channel portions 29 and 30, respectively, throughout their periphery, in order to provide a channel of adequate thickness to receive the scraping shoes 13 and 15. These scraping shoes have tapered end portions 31 and 32 which overlap at the meeting point of the shoes, which is on the center line or axis of the blades. The blades 14 and 16 and the cover member 26 are also provided with spring receiving grooves 33 and 34, and these grooves open into larger recesses 35 and 36 in the radially extending connections such as 37, 38, 39 and 40, which connect the blades and the cooperating cover member portions to the hub portion 18 and the cooperating hub portion 18' of the cover member. The larger recesses 35 and 36 serve as seats for a plurality of spring follower cups 41, there being four of these follower cups and four springs 42 seated in them. The springs 42 are coiled springs and are under compression between the shoes 13 and 15 and the corresponding cups 41.

The connections 37, 38, 39 and 40 are grooved both in the integral blade connections and in the cover member connections with grooves 43 and 44, the grooves 43 being in the connections for the integral blades and the grooves 44 being in the connections for the cover member. These grooves extend to the chamber 19. Two flexible members 45 and 46 are affixed to the shoe 13 and extend through the springs 42 and the members 41 along the grooves 43 and 44 to the shaft 20, where they are secured in any suitable fashion such as by eyelets 49. Two other flexible members 47 and 48 are affixed to the shoe 15 and extend through the corresponding springs 42 and cups 41 to the shaft 20, where they are also secured by eyelets 50. The eyelets 50 are directly opposite the eyelets 49. The shaft 20 is held in spaced relation to the walls of the chamber 19 by means of two collars 51 and 52, the shaft being free to rotate in these collars and the collars being loose in the chamber 19. The flexible members 45, 46, 47 and 48 are preferably constructed of a wire cable, the wire being of a non-corrosive nature so that it will not rust or corrode. Stainless steel wire is suitable for this purpose. The blades, the cover member, the springs and the spring cups are also made of a non-corrosive material such, for example, as aluminum or an aluminum alloy or stainless steel. The blades and the scraper may also be made of plastic, if desired. The essential requirements are that the materials used shall not rust or corrode in their use with bakery goods, and shall be easily cleaned.

The shoes 13 and 15 are pressed radially outward by the springs 42 and are limited in their radial movement by the flexible members 45, 46, 47 and 48. When it is desired to reduce the amount to which the blades may extend, this is accomplished by turning the handle 23 in the direction indicated in Fig. 4, so as to wind the flexible members about the shaft 20. Blades 13 and 15, however, need also to have substantial movement endwise or axially of the hub 17. This axial movement may take place because of the flexibility of the members 45, 46, 47 and 48. However, it is necessary to provide some means for causing the blades to extend themselves axially. The manner in which this is accomplished is illustrated best in Figs. 1 and 8, wherein there is shown a headed pin 53, the head 54 of which bears against the overlapped tapered portions 31 and 32 of the shoes 13 and 15. The pin 53 extends into a coiled spring 55 which is housed in grooves 56 and 57 formed in the blade members 14 and 16 and the cover member 26. A spring follower cup 58 is housed in an enlarged recess 59 formed by complementary recesses in the blades and the cover members. The spring cup 58 is a duplicate of the spring cups 41, but there is no cord or flexible member extending from the shoes through it to the shaft 20. There are webs 60 and 61 connecting the blade portions 14 and 16 and the end of the cover member 26 with the reduced hub portions 18 and 18'. The spring 55 serves to push the shoes 13 and 15 downwardly at all times, but the bending of the springs 42 opposes this action and keeps it within the desired limits. The spring 55, however, is stronger than the springs 42, so that it will normally press the shoes 13 and 15 out at the tip of the mixer with more force than it will at the sides. The reason for this peculiar operation of the shoes lies in the fact that at the top of the mixer the actual speed of travel over the surface of the bowl is very slow. Therefore, in order to do a good job of scraping in the bottom of the mixing bowl, these scraping blades must have a somewhat stronger force pressing them outward axially of the mixer than they need for pressing them radially outward with respect to the mixer.

The operation of the device is believed to be clear from the foregoing description. The mixing bowls are usually shaped as shown in Fig. 3, so that a paraboloidal shape of mixing blade will fit them and extend all the way down to the bottom. As the mixing blade is rotated it may or may not scrape the side walls of the mixing bowl. When it is desired to scrape the walls of the bowl, the handle 23 can be moved to release the scraper shoes 13 and 15 so that they may be moved radially outward by the springs 42, and thus yieldingly engage the walls of the mixing bowl. When the mixing operation is completed and it is desired to wash the mixer, it is removed from its drive shaft 12 and washed with hot water. Hot water will dissolve and remove all of the accumulated dough that may have worked in around the springs 42 and the flexible members. It is thus possible to keep the device in a sanitary condition at all times.

Having thus described my invention, what I claim as new and desire to secure by Letters Patent is:

1. A batter mixing blade having means to scrape the walls of a mixing bowl when the blade is rotated in the bowl, said blade having a curved peripheral edge adapted to engage the interior side and bottom surfaces of the bowl, a scraping shoe movably mounted on said peripheral edge for movement radially with respect to the axis of rotation of the blade and axially with respect to said axis, means on said blade urging the shoe outwardly in both said directions of movement and means limiting the outward movement of said shoe with respect to the peripheral edge, said last named means comprising flexible members secured to the shoe and an anchor for said flexible members mounted in the blade and said first named means comprising stops on the blade and resilient means encircling said flexible members and under compression between the shoe and said stops in said blade for urging the shoe radially of the blade, and resilient means under compression between the shoe and a stop adjacent to the end of the blade.

2. A batter mixing blade having means to scrape the walls of a mixing bowl when the blade is rotated in the bowl, said blade having a curved peripheral edge adapted to engage the interior side and bottom surfaces of the bowl, a scraping shoe movably mounted on said peripheral edge for movement radially with respect to the axis of rotation of the blade and axially with respect to said axis, means on said blade urging the shoe outwardly in both said directions of movement and means limiting the outward movement of said shoe with respect to the peripheral edge, said last named means comprising flexible members secured to the shoe and an anchor for said flexible members mounted in the blade, said anchor comprising a member pivotally mounted at the axis of the blade, and said flexible members being attached to said member so they may be wound thereon.

3. A batter mixing blade having means to scrape the walls of a mixing bowl when the blade is rotated in the bowl, said blade having a curved peripheral edge adapted to engage the interior side and bottom surfaces of the bowl, a scraping shoe movably mounted on said peripheral edge for movement radially with respect to the axis of rotation of the blade and axially with respect to said axis, means on said blade urging the shoe outwardly in a radial direction with respect to the blade axis, other means on said blade urging said shoe outwardly in an axial direction with respect to the blade whereby the shoe is independently movable in both said directions of movement and means limiting the outward movement of said shoe with respect to the peripheral edge, said blade comprising a body member and a cover member fixed thereto, and spaced lugs holding said members in spaced relation thereby providing ready access of cleaning liquid to all of the parts of said blade, said shoes and said means being interposed between and held in position by said body member and said cover member.

4. A batter mixer comprising a body member, a cover member fixed thereto, scraping shoes interposed between said members and movable to project more or less beyond the periphery of said members, means interposed between said members for controlling the extent of projection of said shoes, and means holding said members in spaced relation throughout substantially the entire extent thereof, said shoes comprising two bars curved to approximately follow the periphery of the body member, said controlling means comprising flexible strands fastened to said bars at spaced points thereon, a shaft to which said strands are attached, said shaft being pivotally mounted between said members, a handle for turning said shaft to wind the strands thereon, and resilient means under compression between said bars and said members so as to urge the bars outwardly against the pull of the strands.

5. A batter mixer comprising a body member, a cover member fixed thereto, scraping shoes interposed between said members and movable to project more or less beyond the periphery of said members, means interposed between said members for controlling the extent of projection of said shoes, and means holding said members in spaced relation throughout substantially the entire extent thereof, said shoes comprising two bars curved to approximately follow the periphery of the body member, said controlling means comprising flexible strands fastened to said bars at spaced points thereon, a shaft to which said strands are attached, said shaft being pivotally mounted between said members, a handle for turning said shaft to wind the strands thereon, and resilient means under compression between said bars and said members so as to urge the bars outwardly against the pull of the strands, said resilient means comprising coiled springs, grooves in said members receiving the springs, said grooves having enlarged portions and spring cups seated in the enlarged portions and receiving the inner ends of said springs.

6. A batter mixer comprising a body member, a cover member fixed thereto, scraping shoes interposed between said members and movable to project more or less beyond the periphery of said members, means interposed between said members for controlling the extent of projection of said shoes, said shoes comprising two bars placed end to end and shaped to follow the periphery of the body member and said control means comprising spring means pressing the adjacent ends of said bars outwardly, other spring means pressing the remote ends of said bars outwardly in a direction at substantially right angles to the direction in which said first named spring means presses the adjacent ends, the first named spring means being stronger than the second named spring means, and flexible means limiting the outward movement of said bars.

THEODORE SEYBERT.